United States Patent [19]
Morita

[11] Patent Number: 5,946,041
[45] Date of Patent: *Aug. 31, 1999

[54] APPARATUS AND METHOD OF TRACKING AN IMAGE-FEATURE USING A BLOCK MATCHING ALGORITHM

[75] Inventor: Toshihiko Morita, Kawasaki, Japan

[73] Assignee: Fujitsu Limited, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/685,494

[22] Filed: Jul. 24, 1996

[30] Foreign Application Priority Data

Jan. 31, 1996 [JP] Japan ................................. 8-015806

[51] Int. Cl.⁶ ................................................ H04N 7/32
[52] U.S. Cl. ............................ 348/416; 348/420; 348/699
[58] Field of Search ................................ 348/384, 390, 348/402, 407, 413, 416, 420, 699, 700; 382/190, 232, 236, 238; H04N 7/18, 7/137, 7/32

[56] References Cited

U.S. PATENT DOCUMENTS

| | | | |
|---|---|---|---|
| 4,691,230 | 9/1987 | Kaneko et al. | 348/416 |
| 4,998,168 | 3/1991 | Gillard | 348/699 |
| 5,452,021 | 9/1995 | Kusaka et al. | 348/699 |
| 5,471,252 | 11/1995 | Iu | 348/699 |
| 5,585,843 | 12/1996 | Ishizuka et al. | 348/700 |

*Primary Examiner*—Richard Lee
*Attorney, Agent, or Firm*—Staas & Halsey

[57] ABSTRACT

An image-feature tracking apparatus for tracking an object includes a feature deriving part for deriving at least one feature in an image of the object, and a matching operation part for matching two frames of the image defined at different times in the image of the object and producing an approximate motion vector of the feature. The apparatus further includes a motion-vector correcting part for correcting the approximate motion vector provided in the matching operation part based on a position of the feature derived in the feature deriving part. In the image-feature tracking apparatus, from a corrected motion vector provided in the motion-vector correcting part, a position of the object is detected.

12 Claims, 12 Drawing Sheets

APPARATUS AND METHOD OF TRACKING AN IMAGE-FEATURE USING A BLOCK MATCHING ALGORITHM

BACKGROUND OF THE INVENTION

1. Field of the Invention

The present invention generally relates to an apparatus and a method of tracking an image feature, and more particularly, to an apparatus and a method of tracking an image feature using a block matching algorithm.

An image tracking system has various uses. For example, in a trespasser watching system in a building, a traffic observing system, a satellite tracking system, and a science observing system observing behavior of an animal for a long period of time, an image-feature tracking technique tracking movement of a target in the image moment by moment is required.

Further, to anticipate control action of an automobile or a mobile robot, the image-feature tracking technique for detecting and tracking a moving target, such as a pedestrian, is required. A visual measurement technique is also one of the expected image-feature tracking techniques.

In the visual measurement technique, a plurality of targets (in the case of an airplane, feature points such as top end points of left and right wings, a front end point, a tail end point) are set in one object. Then, by using tracking results of movement of each target, a three-dimension action or movement map of the object is calculated.

2. Description of the Related Art

In a prior-art tracking technique of an image of an object, a dedicated discriminative mark and a dedicated color plate were provided with the object. By using the mark and plate, a fast tracking processing may be provided by a simple image processing technique. However, in these cases, since the mark and the plate must be mounted to the object, the range of applying such image processing technique was limited.

Figure 1:
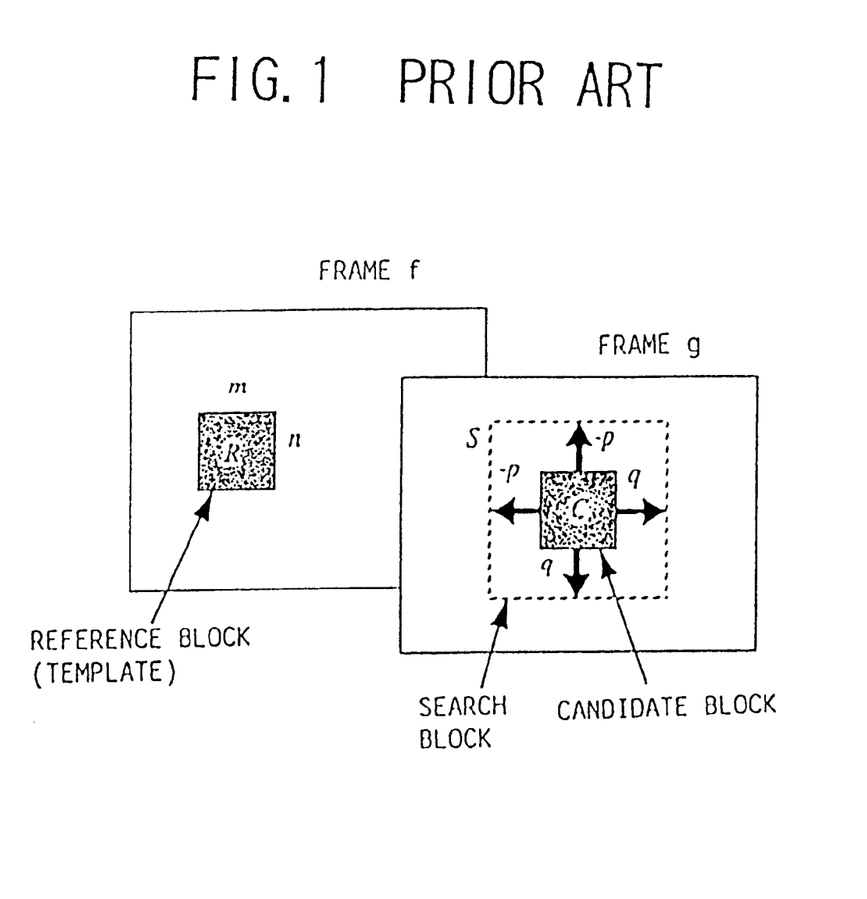
FIG. 1 shows an illustration for explaining a prior-art image-feature tracking apparatus using a block matching algorithm.

On the contrary, recently, an image-feature tracking apparatus using a block matching algorithm is in practical use. FIG. 1 shows an illustration for explaining the prior-art image-feature tracking apparatus using the block matching algorithm. In FIG. 1, a frame f indicates an image frame at one instant of time, and a frame g indicates an image frame at the next instant of time.

In the prior-art image-feature tracking apparatus, first, in the frame f, an image block of a tracking target is defined as a reference block R. Coordinates of each picture element in the reference block R is represented by (x=1 to m, y=1 to n). The reference block R is generally referred to as a template. Next, in the frame g, the same sized image block is defined as a candidate block C. Coordinates of each picture element in the candidate block C are represented by (u+x, v+y), where u and v are respectively relative coordinates from a position of the reference block R. In the above situation, a matching D(u, v) of the reference block R and the candidate block C is calculated as a position of the candidate block C is varied within an area $(-p \leq u \leq +q, -p \leq v \leq +q)$ of a search block S shown in FIG. 1.

In the above calculating process, from the position of the candidate block C giving a maximum value in the matching D, the amount of motion of the target between the frame f and the frame g may be calculated. Repeating the above-discussed process, a tracking process may be carried out.

In the process, an image, in which the reference block R is defined, is referred to as a reference image, and an image, in which the candidate block C is defined, is referred to as a search image. Since the image-feature tracking apparatus using the block matching algorithm requires no dedicated marks, such tracking apparatus is applicable for a variety of uses.

The block matching algorithm is generally given in the following equation.

$$D(u, v) = \sum_{x=1}^{m} \sum_{y=1}^{n} \left| S(u + x, v + y) - R(x, y) \right|,$$

$$-p \leq u, v \leq q$$

where C(u+x, v+y), R(x, y) respectively indicate intensity of each picture element in the each block. In the above algorithm, an integral summation of an absolute value of a difference between the two image blocks is calculated. As a value of the integral summation is smaller, the value of the matching D increases. Therefore, the coordinates (u, v) when the value of the matching D(u, v) is smallest indicates the amount of motion of the target.

As a tracking mode, a fixed-template mode and a sequential-template mode have been developed. The fixed-template mode is used for tracking a specified pattern. The sequential-template mode is used for observing a more random motion such as movement of steam and watching a trespasser. The prior-art image-feature tracking apparatus using the block matching algorithm commonly uses the fixed-template mode.

In the fixed-template mode, first, the reference image (template image) of the object is set and stored, and the matching of the reference image with the sequentially-provided search image is calculated. Namely, the reference image is given at a specified time f0, and the candidate block C is successively updated at times f, f+1, f+2, . . . .

At these times, matching of the reference image at the time f0 and the candidate block C at the time f, matching of the reference image at the time f0 and the candidate block C at the time f+1, and matching of the reference image at the time f0 and the candidate block C at the time f+2, . . . are successively calculated. In the successive calculation, since the matching algorithm is carried out for one template, the specified pattern in the template may be tracked without missing any movement.

On the other hand, in the sequential-template mode, an instant motion vector of the image block of the object is measured. In this mode, without setting the specified template, matching the algorithm between two serial frames is repeated. Namely, matching of the image at the time f and the candidate block C at the time f+1, matching of the image at the time f+1 and the candidate block C at the time f+2, and matching of the image at the time f+2 and the candidate block C at the time f+3, . . . are successively calculated.

Applying this mode, a moving object may be recognized, and from many motion vectors (which are also referred to as optical flow), three-dimensional motion parameters may be calculated.

However, the above-discussed image-feature tracking apparatus using the block matching algorithm has the following disadvantages.

In the prior-art image-feature tracking apparatus using the block matching algorithm, when tracking a specified object, there is a problem in that an unstable tracking operation occurs when the object rotates or a distance between a camera and the object varies.

SUMMARY OF THE INVENTION

It is an object of the present invention to provide an image-feature tracking apparatus and an image-feature tracking method. In the apparatus and method, a stable tracking operation of an object may be carried out even when a target to be tracked rotates, expands and/or contracts. This permits the disadvantages described above to be eliminated.

The object described above is achieved by an image-feature tracking apparatus for tracking an object comprising: a feature deriving part for deriving at least one feature in an image of the object; a matching operation part for matching two frames of the image defined at different times in the image of the object and producing an approximate motion vector of the feature; and a motion-vector correcting part for correcting the approximate motion vector provided in the matching operation part based on a position of the feature derived in the feature deriving part; wherein from a corrected motion vector provided in the motion-vector correcting part, a position of the object is detected.

The object described above is also achieved by the apparatus mentioned above, wherein: the matching operation part comprises a part for calculating block matching of a first block image and a second block image in the two frames, and a part for calculating a position of the feature in the second block image where the block matching is maximized and producing the position of the feature as the approximate motion vector; and the motion-vector correcting part comprises a part for correcting the approximate motion vector by adding deviation between the positions of the features in the images of the two frames to the approximate motion vector.

The object described above is also achieved by the apparatus mentioned above, further comprising an imaging device which images the object and provides an image of the object to the matching operation part and the feature deriving part.

The object described above is also achieved by an image-feature tracking method for tracking an object comprising the steps of: (a) deriving at least one feature of an image of the object; (b) matching two frames of the image defined at different times in the image of the object and producing an approximate motion vector of the feature; and (c) correcting the approximate motion vector provided in the step (b) based on a position of the feature derived in the step (a); wherein from a corrected motion vector provided in the step (c), a position of the object is detected.

According to the above-mentioned image-feature tracking apparatus or image-feature tracking method, the approximate motion vector of the object is calculated based on a sequential-template mode. Further, the approximate motion vector is corrected based on the derived feature. Therefore, even when the object to be tracked rotates, expands, contracts, and changes, a stable tracking operation of the object may be obtained.

The object described above is also achieved by the apparatus mentioned above, further comprising a part calculating a center position of a plurality of features based on a plurality of the motion vectors produced from the motion-vector correcting part, wherein movement of the object is calculated by using the center position of the plurality of features as a representative position of the object.

According to the above-mentioned image-feature tracking apparatus, the center position of a plurality of features is set to be the representative position of the object, and using the representative position, movement of the object is calculated. Therefore, even when the object to be tracked rotates, expands, contracts, and changes, movement of the object may be easily measured.

The object described above is also achieved by the apparatus mentioned above, further comprising a part for calculating a degree of rotation, expansion, and contraction of the object based on the plurality of motion vectors produced from the motion-vector correcting part.

According to the above-mentioned image-feature tracking apparatus, even when the object to be tracked rotates, expands, and contracts, the degree of movement, rotation, expansion, and contraction of the object may easily be measured.

The object described above is also achieved by the apparatus mentioned above, further comprising: a part for changing image resolution of the object; and a part for averaging a plurality of the representative positions of the object provided for a plurality of image resolutions.

According to the above-mentioned image-feature tracking apparatus, for a plurality of resolutions of the image, a plurality of representative positions of the object are averaged. Therefore, a shape of the object may easily be determined, and, thus, measuring precision of a moving position of the object may be improved.

Other objects and further features of the present invention will be apparent from the following detailed description when read in conjunction with the accompanying drawings.

DETAILED DESCRIPTION OF THE PREFERRED EMBODIMENTS

Figure 2:
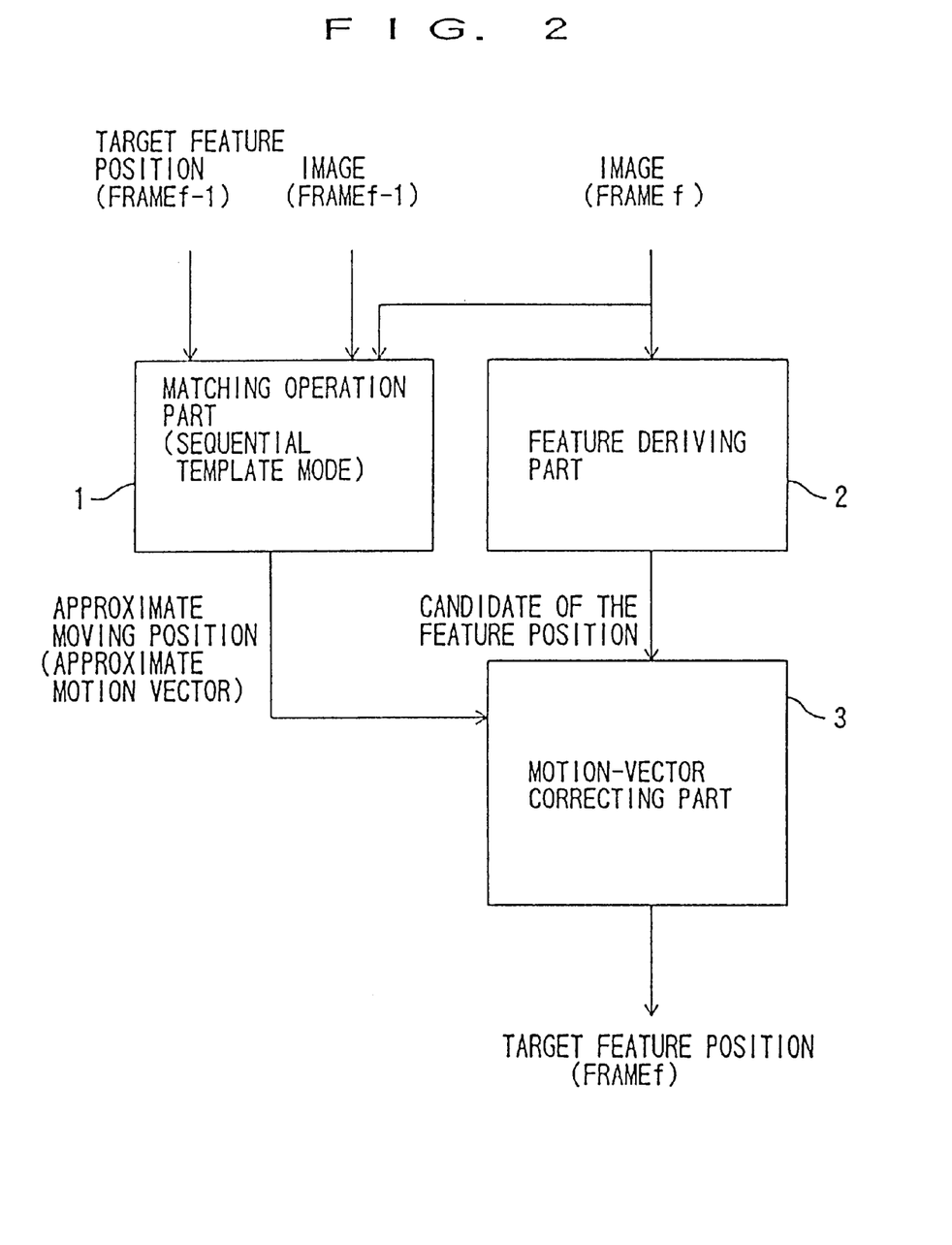
FIG. 2 shows a block diagram of an image-feature tracking apparatus according to the present invention.

First, a description will be given of a principle of an image-feature tracking apparatus and an image-feature tracking method according to the present invention. FIG. 2 shows a block diagram of the image-feature tracking apparatus according to the present invention. The image-feature tracking apparatus according to the present invention is constructed with a matching operation part 1, a feature deriving part 2, and a motion-vector correcting part 3.

In the matching operation part 1, a sequential-template mode is used. Therefore, the matching operation part 1 is provided with an image block in a frame at time f-1, an image block in a frame at time f, and a target feature position of the image block in the frame at time f-1.

The matching operation part 1 carries out the block matching algorithm using the sequential-template mode from the above-discussed image blocks of the two frames and the feature position of the image block in the frame at time f-1, and produces the amount of movement of the feature in the object.

Since the amount of movement of the feature, as later mentioned, includes a quantization error in the sequential-template mode, the amount of movement of the feature is calculated as an approximate amount of movement, and, thus, the matching operation part 1 produces an approximate moving position.

The feature deriving part 2 calculates a degree of feature of each picture element (will be described in further detail) from the image block of the frame at time f, and produces the picture element having a higher degree of feature as a candidate of the feature position.

The motion-vector correcting part 3 searches the feature in a surrounding area of the approximate moving position of the feature, and produces the feature position of the image block in the frame at time f.

In the following, an operation of the image-feature tracking apparatus according to the present invention will be described in detail.

In the matching operation part 1, the approximate moving position (distance) is calculated using the sequential-template mode. When the object rotates, expands, or contracts, the amount of pattern variation of the object is generally small for a very short time. Therefore, it is assumed that the sequential-template mode updating the template for each frame is also applicable for tracking the object when the object is rotating, expanding, and contracting.

However, when the sequential-template mode is used for the block matching algorithm of the image-feature tracking apparatus, it was difficult to precisely track the object. As a result of the inventor's analysis, it was found that in the sequential-template mode, when the template is updated for each frame, the quantization error is accumulated and increased, and, thus, this causes inaccurate tracking.

On the other hand, the feature deriving part 2 may produce positions of features, such as corners of the object. Since any corners are recognized as points, there is no influence even if the image pattern rotates, expands, and/or contracts.

However, in a case where the tracking operation is carried out by using only the positions of the features, when there are a plurality of features, it is difficult to recognizing movement of the features between the two frames, and, thus, stable tracking may not be carried out.

The image-feature tracking apparatus or image-feature tracking method according to the present invention complementary uses both the block matching algorithm by the sequential-template mode and a feature deriving process, namely, correcting the approximate moving position of the feature produced from the matching operation part 1 and producing a corrected feature position from the motion-vector correcting part 3. Therefore, even when the tracking object rotates, expands, and/or contracts, stable tracking of the object may be carried out.

Next, a description will be given of a problem of the block matching algorithm using the sequential-template mode, by referring to FIG. 3.

Figure 3:
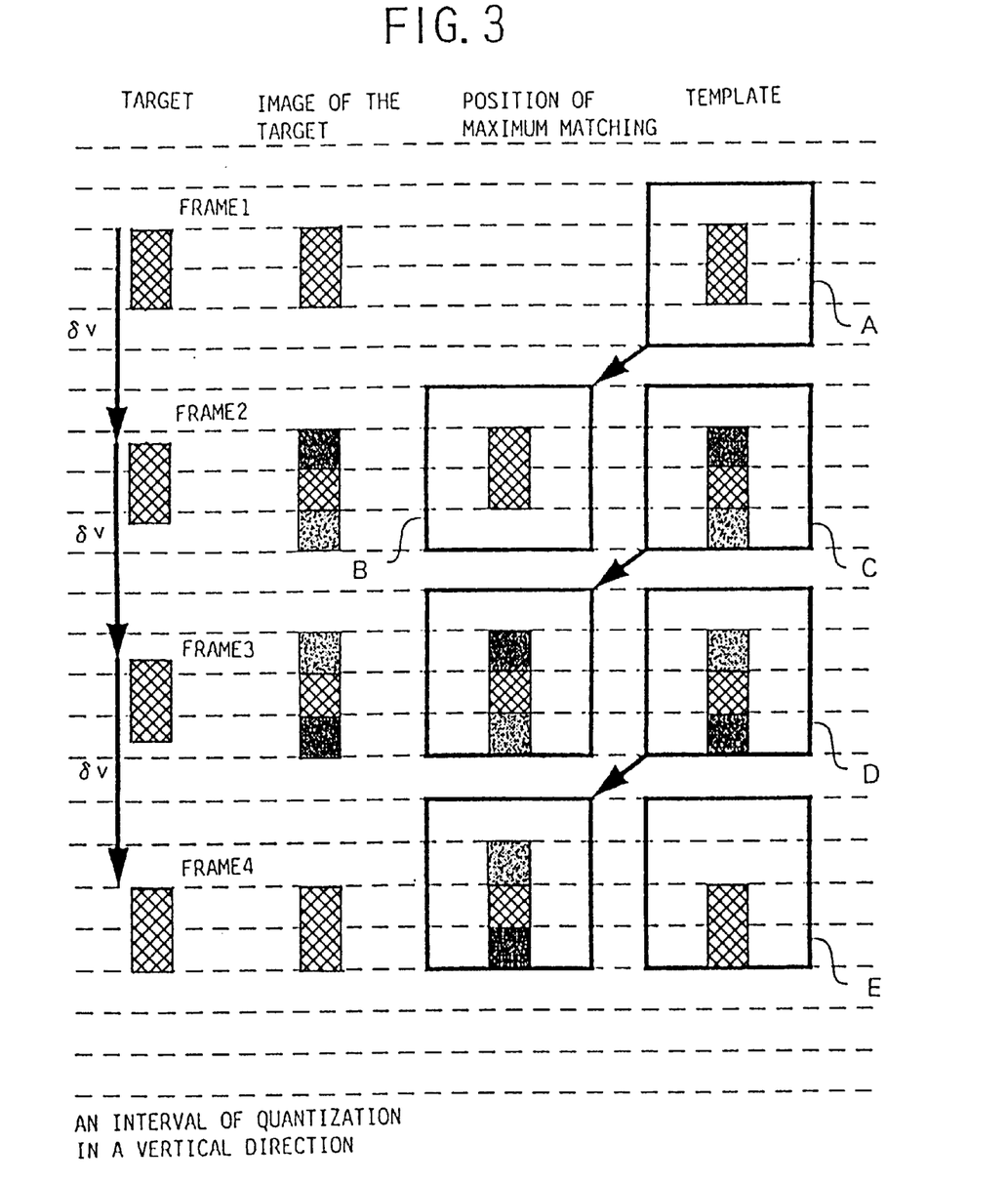
FIG. 3 shows an illustration for explaining a problem of the block matching algorithm using a sequential-template mode.

FIG. 3 shows an illustration for explaining the problem of the block matching algorithm using the sequential-template mode. In FIG. 3, particularly, a cause for failing of tracking is shown. FIG. 3 shows a case where a rectangular target moves at the same intervals of distance ($\delta V = 5.3$ picture elements/frame) in a vertical direction.

In this drawing, frame 1 to frame 4 are overlapped. Horizontal dotted lines indicate an interval of quantization of an imaging device in a vertical direction. When the target is imaged in the imaging device, each picture element is, by quantization, represented by a value which is obtained by integrating density of the object in the picture element.

Next, a description will be given of a sequence of the matching operation processing.

(1) In the frame 1, a template A is defined so that the object is located in the center position of the template A.

(2) In the frame 2, the target moves by the interval $\delta V$ in a lower direction. An image of the moved target is, by quantization, represented by three quantization levels including the half tone. The image of the moved target is matched with the present template A, and a target position giving a maximum matching value is calculated.

As a result, a block B is obtained. Since the template is updated for each frame, then, the image of the target is set in the block B. Thus, a new template C is obtained. At this time, the template C is shifted from the previous template A by $$\delta e = \delta V - [\delta V],$$

where the symbol [ ] indicates a rounding-off operation.

(3) When the above-discussed process is repeated in the frame 3 and the frame 4, the amount of shift of a template D in the frame 3 becomes $2 \times \delta e$, and the amount of shift of a template E in the frame 4 becomes $3 \times \delta e$, and, thus, the amount of shift gradually increases.

As discussed above, when using the sequential-template mode for the matching operation processing, the quantization error is accumulated, and the precise operation of tracking the target may not be carried out.

In the present invention, to correct the above-discussed shift, the features such as corners of the object are derived in the feature deriving part 2.

Figure 4:
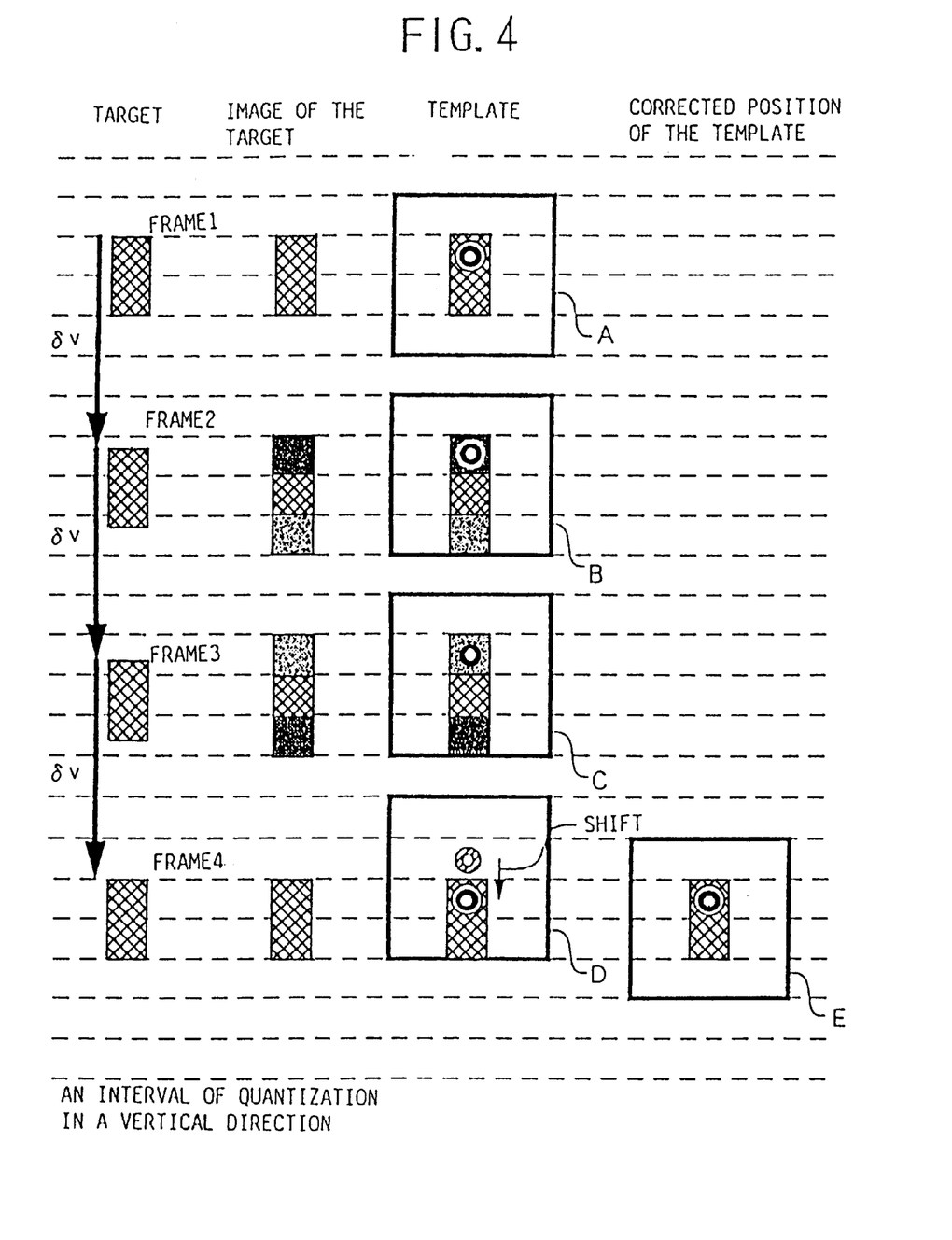
FIG. 4 shows an illustration for explaining a correcting operation of a shift according to the present invention.

FIG. 4 shows an illustration for explaining a correcting operation of the shift according to the present invention. To simplify the description, the top-end picture element of the rectangular target is set to be the feature (which is represented by a symbol "⊙"). In the sequential-template mode, when tracing the positions of the feature of the image in each template, the feature is detected in a second picture element from the top end in the templates A, B, and C.

However, in the template D, the feature is detected in a third picture element from the top end. This shows that the tracking operation is shifted by one picture element. Therefore, as shown in a template E, by shifting a position of the template by the one picture element in a lower direction, the tracking shift may be corrected.

The above discussion is given about the operation in a vertical direction. However, in practical use, since the object moves dimensionally, the correcting operation is also carried out dimensionally.

Figure 5:
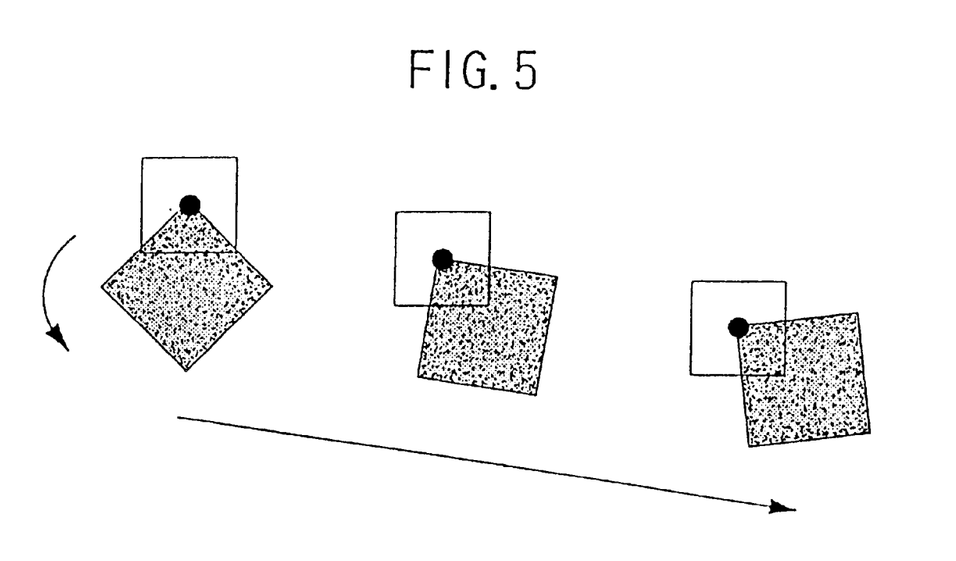
FIG. 5 shows an illustration for explaining an operation of the image-feature tracking apparatus according to the present invention.

FIG. 5 shows an illustration for explaining an operation of the image-feature tracking apparatus according to the present invention. In the present invention, the tracking process by the sequential-template mode and the feature deriving process are used complementary. Since the tracking process by the sequential-template mode updates the template by a small interval of distance, there is no influence even if the object rotates, expands, and/or contracts.

Further, since in the feature deriving process, the feature is produced as one point regardless of the direction, etc., of the corner of the object, there is also no influence from the rotation, expansion, and/or contraction of the object. Therefore, in the image-feature tracking apparatus using both the processes according to the present invention, even when the object to be tracked rotates, expands, and contracts, as shown in FIG. 5, a stable tracking operation may be carried out.

Figure 6:
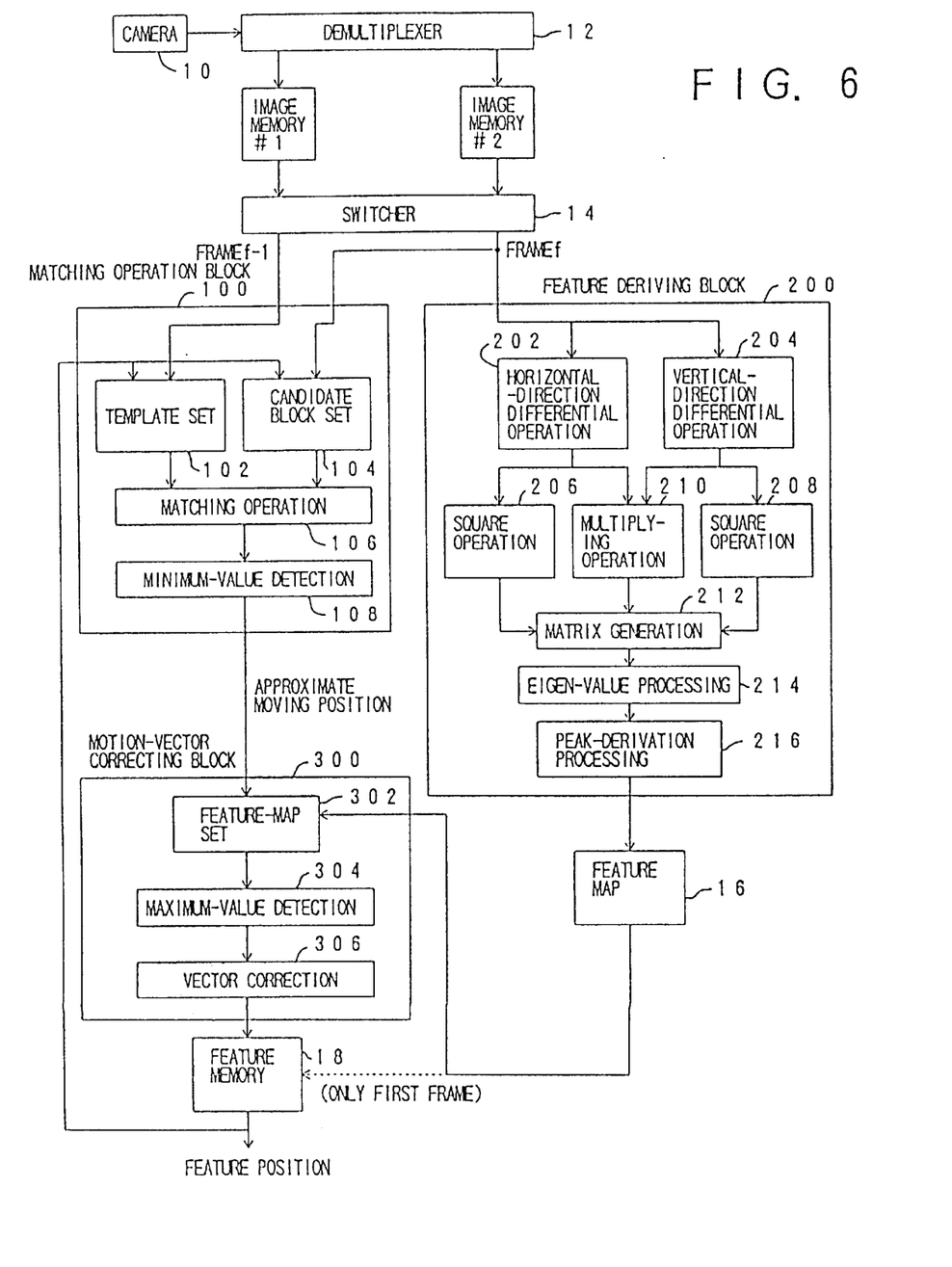
FIG. 6 shows a block diagram of a first embodiment of the image-feature tracking apparatus according to the present invention.

Next, a description will be given of a first embodiment of the image-feature tracking apparatus according to the present invention. FIG. 6 shows a block diagram of the first embodiment of the image-feature tracking apparatus according to the present invention. The image-feature tracking apparatus of the first embodiment is constructed with a matching operation block 100, a feature deriving block 200, a motion-vector correcting block 300, and external circuits.

A demultiplexer 12 produces images provided from a camera 10 to image memories #1, #2 in turn for every frame. Each of the image memories #1 and #2 stores an image of one frame. A switcher 14 has a first mode directly passing the two inputs and a second mode changing the two inputs, and repeats the two modes in turn every frame. As a result of the above operations, from the switcher 14, two serial frame images, a frame f-1 and a frame f, are produced.

The matching operation block 100 is provided with the two images (frame f-1 and frame f) and a position of a feature in the frame f-1. The block 100 carries out the matching operation with the above elements, and produces the approximate moving position of the feature.

On the other hand, the feature deriving block 200 receives the image of the frame f, and produces a feature map 16. The feature map 16 is a two-dimensional array of data in which a discrimination degree of the feature is stored for each picture element.

The motion-vector correcting block 300 is constructed with the approximate moving position of the feature provided from the matching operation block 100 and the feature map 16 provided from the feature deriving block 200. As a result, the block 300 produces a feature position in a feature memory 18. The feature position is an output of the image-feature tracking apparatus and an input of the matching operation block 100 for the next frame.

The matching operation block 100 has, for example, template setting means unit 102, candidate-block setting unit 104, matching operating unit 106, and minimum-value detecting unit 108. The template setting means 102 sets a template of (m×n) picture elements from the image of the frame f-1 so that the position of the feature is adjusted in the center of the template.

The candidate-block setting unit 104 scans an area of –p to +q around the center of the above-mentioned template, and successively sets a candidate block of (m×n) picture elements from the image of the frame f. In the matching operating unit 106, a matching operation of the template and the candidate block is repeated, and, as a result, the minimum value of the matching operation is produced in minimum-value detecting unit 108. At this time, the approximate moving position to be produced is obtained as a position of the candidate block giving the minimum value.

A configuration of the feature deriving block 200 depends on an algorithm for calculating the degree of discrimination of the feature. For example, the following algorithm may be used.

First, density of each picture element in the image is represented by I(x, y). "x" and "y" are coordinates in horizontal and vertical directions of the picture element, respectively.

Next, a density gradient vector g(x, y), which indicates a degree and a direction of the density variation in an area adjacent to the picture element (x, y), is defined as follows:

$$g = \begin{bmatrix} I_x \\ I_y \end{bmatrix}$$

where, $$I_x = \frac{\partial}{\partial x} I(x, y),$$

$$I_y = \frac{\partial}{\partial y} I(x, y)$$

where I(x, y) indicates density of the picture element (x, y).

For example, in an outline part of the object, the degree of the density gradient vector g(x, y) is large, and its direction crosses a direction of the outline at a right angle.

Subsequently, for a block area of (2n+1)×(2n+1) about the picture element (x, y), from the density gradient vector of each picture element in that block area, the following defined 2×2 symmetric matrix G is calculated.

$$G = \sum_{x=-n}^{n} \sum_{y=-n}^{n} gg^T = \sum_{x=1}^{n} \sum_{y=1}^{n} \begin{bmatrix} I_x^2 & I_x I_y \\ I_x I_y & I_y^2 \end{bmatrix}$$

In the symmetric matrix G, eigenvalues thereof are represented by $\lambda_1$ and $\lambda_2$. The eigenvalues $\lambda_1$, $\lambda_2$ have the following characteristics for a density variation pattern in the block area. One example of the characteristics will be described by referring to FIG. 7.

Figure 7:
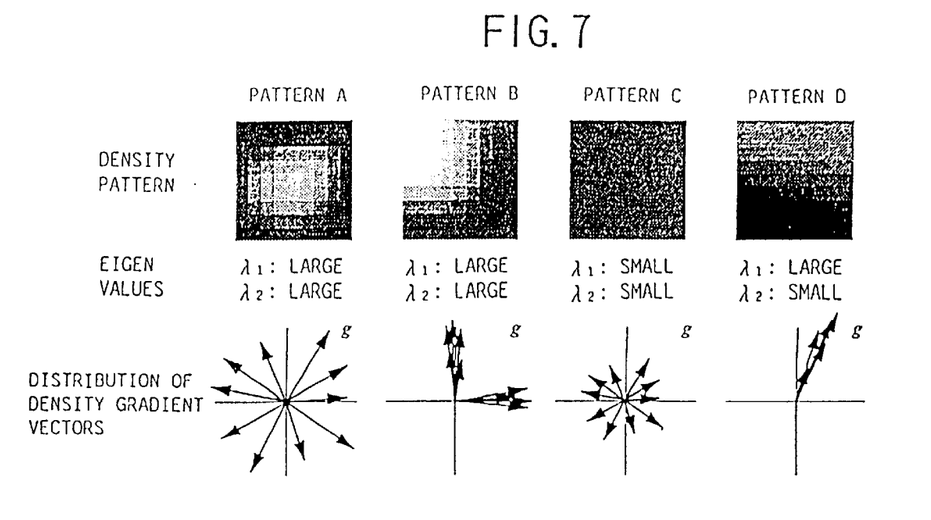
FIG. 7 shows an illustration for indicating a relationship between eigenvalues and a feature pattern.

FIG. 7 shows an illustration for indicating a relationship between the eigenvalues and the feature pattern. A pattern A in FIG. 7 shows a case where the density gradient vectors have a variety of directions (0° to 360°) in the block area. In this case, the eigenvalues $\lambda_1$, $\lambda_2$, have a large value. A pattern B shows a case where the corner of the object is included in the block area. In this case, the eigenvalues $\lambda_1$, $\lambda_2$ have a large value. A pattern C shows a case where there is no large density variation in the block area. In this case, the eigenvalues $\lambda_1$, $\lambda_2$ have a small value. A pattern D shows a case where a straight line is included in the block area. In this case, the eigenvalue $\lambda_1$ has a large value, and the eigenvalue $\lambda_2$ has a small value. In these density patterns, the pattern A or the pattern B should be determined as a pattern having a high degree of feature discrimination.

To obtain the above result, the lower eigenvalue, $$\lambda_{min} = min\ (\lambda_1, \lambda_2)$$

may be the degree of feature discrimination. By calculating the degree of feature discrimination of each picture element in the image based on the above equation, a two dimensional distribution of the degree of feature discrimination may be obtained.

Figure 8:
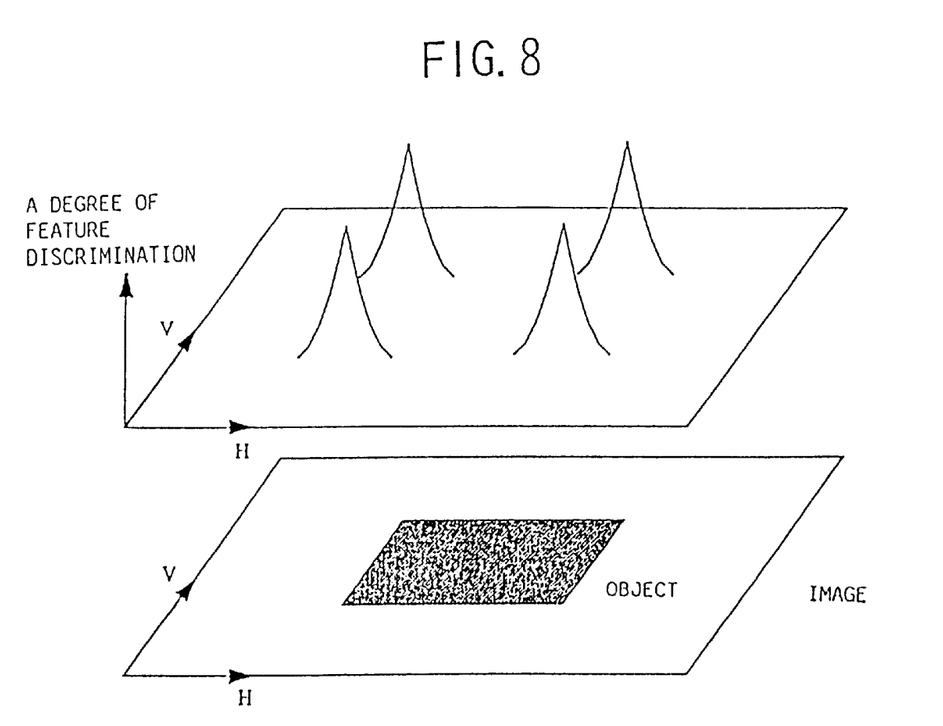
FIG. 8 shows an illustration for indicating an example of a two dimensional distribution of a feature discriminating degree of each picture element in the image.

FIG. 8 shows an illustration for indicating an example of the two dimensional distribution of the degree of feature discrimination of each picture element in the image. As shown in FIG. 8, when the object has a square shape, the degree of feature discrimination has the maximum value at an area of the corner of the object. Therefore, by peak-derivation processing, the coordinates of the feature position are obtained.

The feature deriving block 200 based on the above-discussed algorithm is, as shown in FIG. 6, constructed with horizontal-direction differential operating unit 202, vertical-direction differential operating unit 204, square operating units 206, 208, multiplying units 210, matrix generating unit 212, eigen-value calculating unit 214, and peak-derivation processing unit 216.

The horizontal and vertical direction differential operating units 202, 204 differentiate the image of the frame f to produce Ix, Iy. The square operating means 206, 208 respectively calculate $Ix^2$, $Iy^2$. The multiplying units 210 multiplies Ix with Iy to produce Ix Iy. The matrix generating unit 212 produces the symmetric matrix G. The eigen-value (degree of feature discrimination) calculating unit 214 produces $\lambda_{min}$. The peak-derivation processing unit 216 derives the peak of the degree of feature discrimination. Namely, the peak-derivation processing unit 216 forms the two dimensional matrix having the same size as that of the image, and produces the feature map in which corresponding degree of feature discrimination is written in a position having the feature, and data "0" is written in a position having no feature.

As shown in FIG. 6, the motion-vector correcting block 300 is constructed with feature-map setting unit 302, maximum-value detecting unit 304, and vector correcting unit 306. In the feature map, the feature-map setting unit 302 sets an area of ±1 picture element about the approximate moving position provided from the matching operation block 100. The area is set to be ±1 picture element, since the position shift due to the quantization error in the sequential-template mode is to be less than ±1 picture element for one operation. The maximum-value detecting unit 304 detects a feature having the maximum degree of feature discrimination from a plurality of features included in the set area, and produces a deviation from the center of the set area. Finally, the vector correcting unit 306 produces the corrected feature position by adding the deviation to the approximate moving position.

In the image-feature tracking apparatus shown in FIG. 6, after the feature map of the whole image is formed, the block area is set so that the approximate moving position of the feature is adjusted in the center of the block area. However, the feature map may initially be formed only for an area adjacent to the approximate moving position. Further, without carrying out the peak-derivation processing in the feature deriving block 200, the peak-derivation processing may be carried out after the feature map is set in the motion-vector correcting block 300.

In the image-feature tracking apparatus of this embodiment, in synchronization with the updating of the image frame, each process is repeated. However, in the first frame, the matching operation block 100 and the feature deriving block 200 are not operative, instead, as shown in a dotted line of FIG. 6, all features are transformed to the feature memory 18, and the feature memory 18 is initialized. In addition, as necessary, features may be selected only for an area designated by a user.

Figure 9:
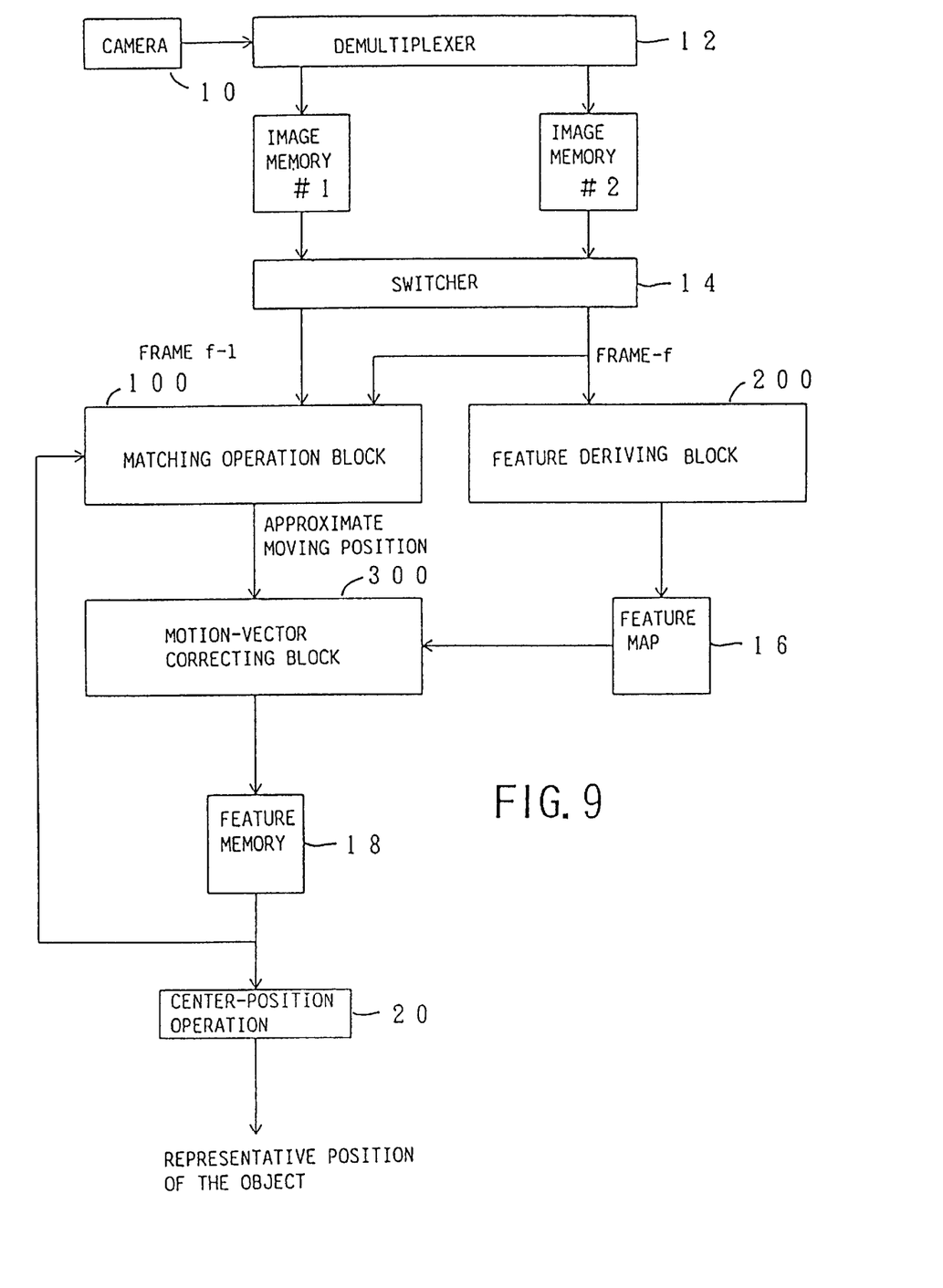
FIG. 9 shows a block diagram of a second embodiment of the image-feature tracking apparatus according to the present invention.
Figure 10:
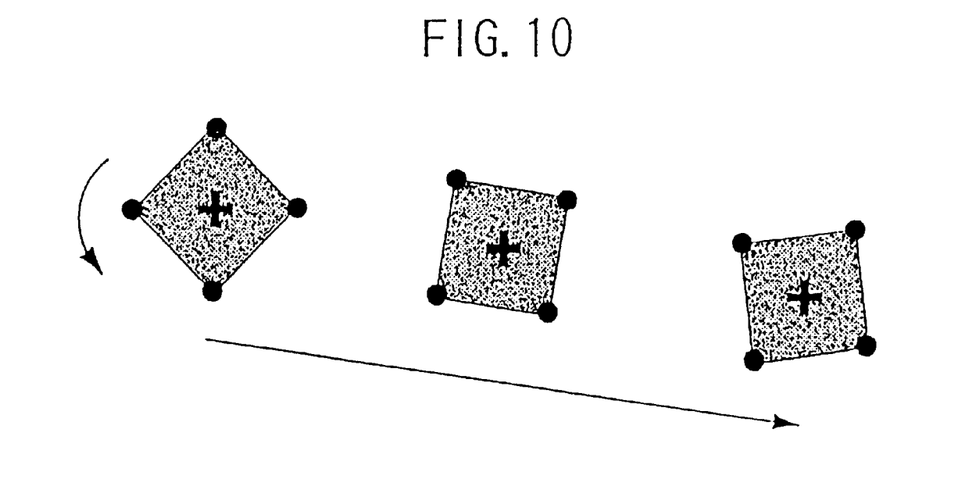
FIG. 10 shows an illustration for explaining an operation of the second embodiment of the image-feature tracking apparatus according to the present invention.

Next, a description will be given of a second embodiment of the image-feature tracking apparatus and the image-feature tracking method according to the present invention. FIG. 9 shows a block diagram of the second embodiment of the image-feature tracking apparatus according to the present invention. FIG. 10 shows an illustration for explaining an operation of the second embodiment of the image-feature tracking apparatus according to the present invention. Elements in FIG. 9 which are the same as those of FIG. 6 are given the same reference numerals.

In the second embodiment of the image-feature tracking apparatus, for a plurality of features in one object, the above-discussed tracking process is carried out, and a center position of the plurality of features is produced. In the second embodiment of the image-feature tracking apparatus shown in FIG. 9, center-position operating unit 20 for calculating the center position of a plurality of features is added to the first embodiment shown in FIG. 6. In the center-position operating unit 20, for a plurality of features, an average B of a feature position Pi is given by the following equation and is produced as a representative position of the object.

$$B = \frac{1}{n}\sum_{i=1}^{n} P_i$$

As shown in FIG. 10, the center position (represented by a symbol "+") of a plurality of features (represented by symbols "●") is operative as a constant point. Therefore, even when the object to be tracked rotates, expands, or contracts, the object may precisely be tracked by calculating only the moving component of the center position.

Figure 11:
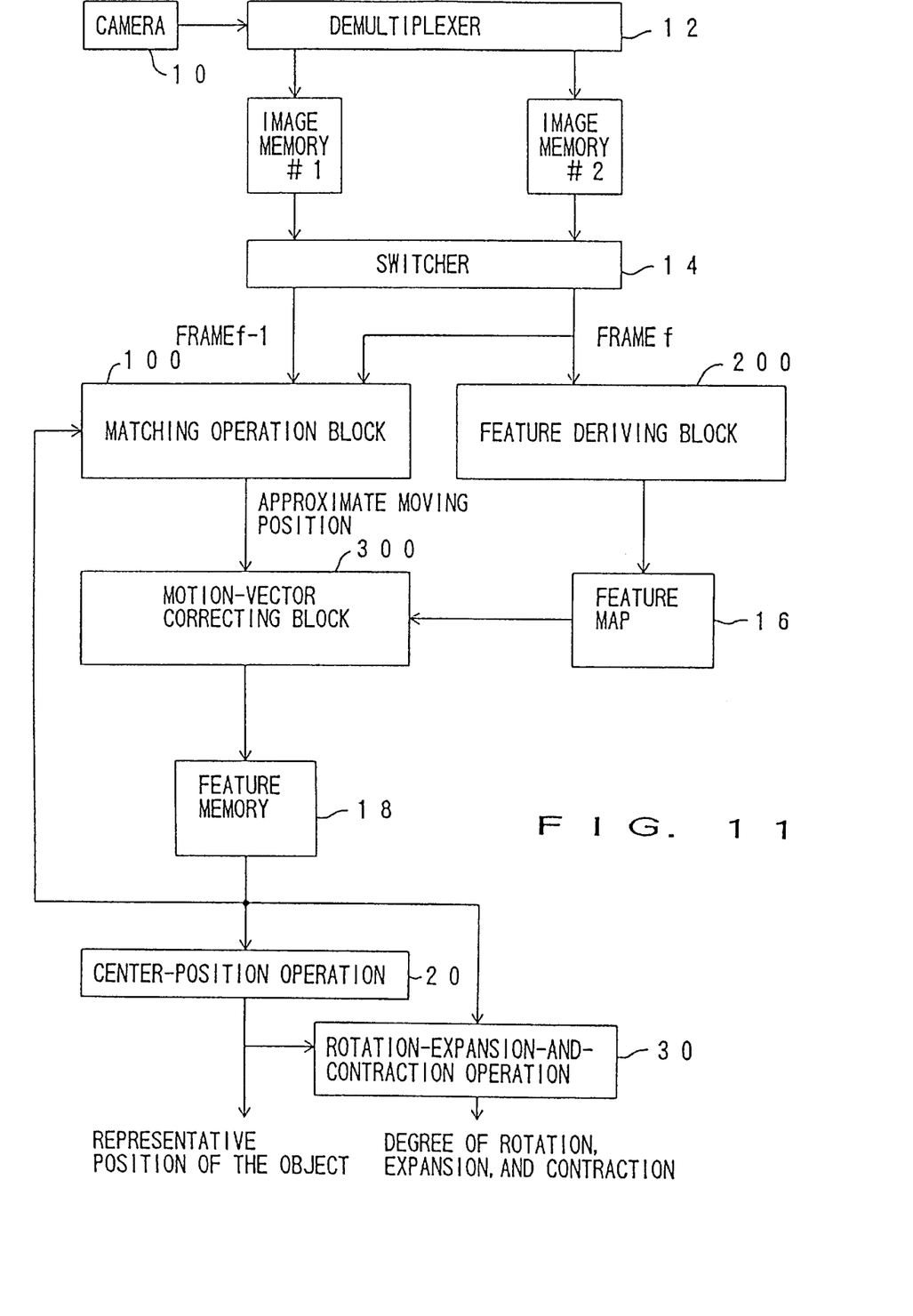
FIG. 11 shows a block diagram of a third embodiment of the image-feature tracking apparatus according to the present invention.

Next, a description will be given of a third embodiment of the image-feature tracking apparatus and the image-feature tracking method according to the present invention. FIG. 11 shows a block diagram of the third embodiment of the image-feature tracking apparatus according to the present invention. Elements in FIG. 11 which are the same as those of FIG. 9 are given the same reference numerals.

The third embodiment of the image-feature tracking apparatus has means for calculating the degree of rotation, expansion, and contraction of the object from a result of tracking a plurality of features. Therefore, not only the moving component of the object, also the degree of rotation, expansion, and contraction of the object can be measured. In the third embodiment of the image-feature tracking apparatus shown in FIG. 11, rotation-expansion-and-contraction operating unit 30 for calculating the degree of rotation, expansion, and contraction of the object is added to the second embodiment shown in FIG. 9.

Calculation of the degree of rotation, expansion, and contraction may be carried out as follows.

First, the positions of the features in a frame 1 and the frame f are represented by the following two (2×n) matrices (n is the number of features).

$$A_1 = [P_1^1 P_2^1 \cdots P_n^1]$$
$$A_1 = [P_1^f P_2^f \cdots P_n^f]$$

where $P^f_i$ is a vector indicating a position of the i-th feature in the frame f, and is represented by the coordinates of the representative position of the object. When the object rotates, expands, and contracts, conversion from the matrix Al to the matrix Af may be represented by the following equation using (2×2) matrix Qf.

$$Af = Qf\, Al$$

Resolving the above equation using the method of least squares, the matrix Qf is given as follows:

$$Q_f = A_f A^T_1 (A_1 A^T_1)^{-1}$$

where the symbol "T" indicates matrix transposition.

When the matrix Qf is represented as follows:

$$Q_f = \begin{bmatrix} a_{11} & a_{12} \\ a_{21} & a_{22} \end{bmatrix}$$

a degree of expansion and contraction Sf and a rotation angle θf (for the first frame) may be obtained by using the following equations, $$S_f = \sqrt{a_{11}^2 + a_{21}^2} \quad \theta_f = a\tan\left(\frac{a_{21}}{a_{11}}\right)$$

Figure 12:
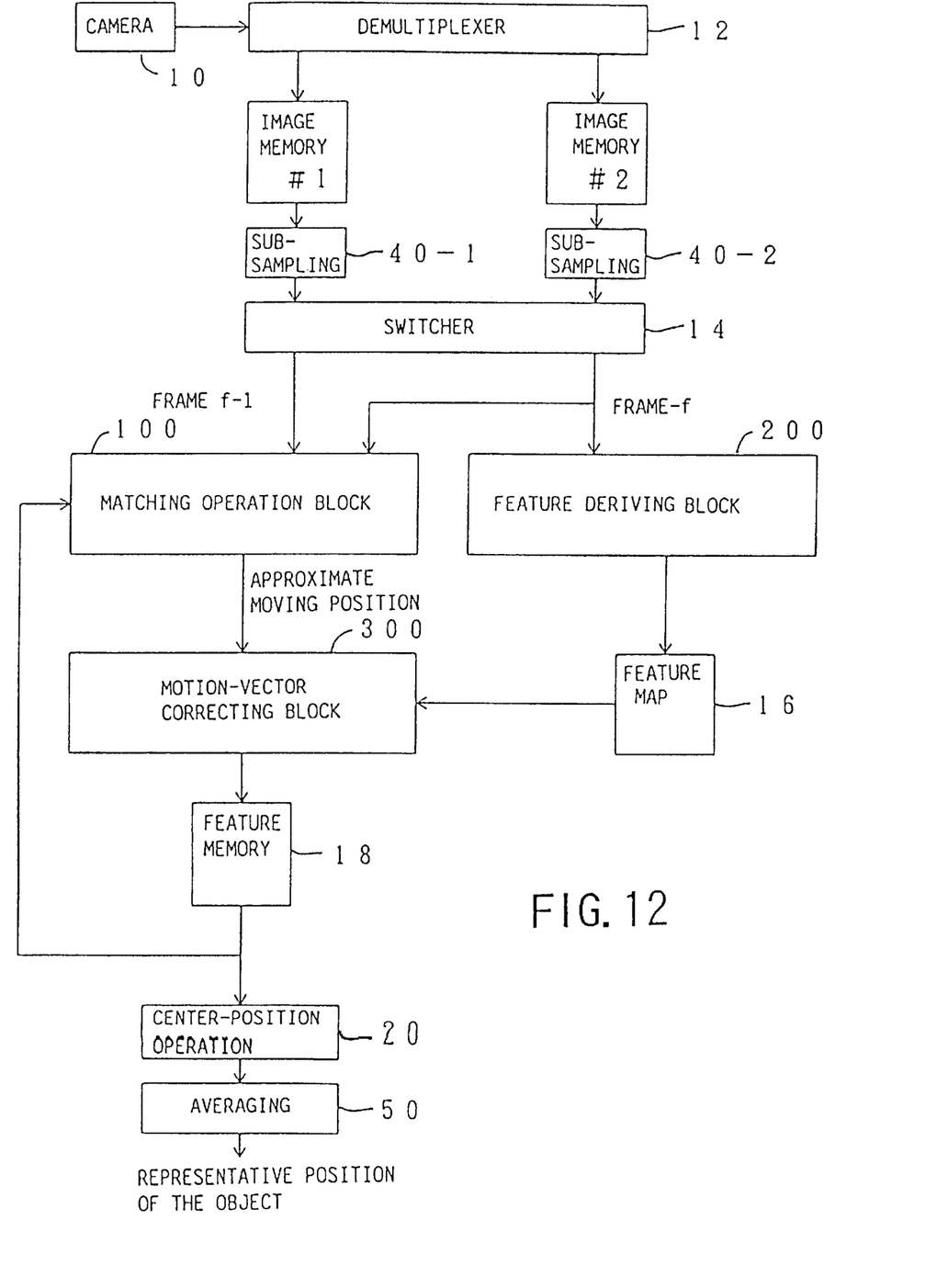
FIG. 12 shows a block diagram of a fourth embodiment of the image-feature tracking apparatus according to the present invention.

Next, a description will be given of a fourth embodiment of the image-feature tracking apparatus and the image-feature tracking method according to the present invention. FIG. 12 shows a block diagram of the fourth embodiment of the image-feature tracking apparatus according to the present invention. Elements in FIG. 12 which are the same as those of FIG. 9 are given the same reference numerals.

The fourth embodiment of the image-feature tracking apparatus has means for changing image resolution and means for averaging the center positions of the features for every image resolution. By using only a single-resolution image, a shape of the image cannot be easily determined, and, thus, an unstable tracking operation may occur. However, in this embodiment, by using a plurality of images having different resolutions, the shape of the image may easily be determined. Further, by averaging the tracking results produced using the a plurality of images, a tracking operation of the object may be stabilized.

In the fourth embodiment of the image-feature tracking apparatus shown in FIG. 12, subsampling units 40-1, 40-2 and averaging unit 50 for averaging the representative positions of the object are added to the second embodiment shown in FIG. 9.

The subsampling units 40-1, 40-2 sample a part of the picture elements from the image data provided from the image memories #1 and #2. As a result, the image resolution may be varied.

In the image-feature tracking apparatus shown in FIG. 12, by the subsampling units 40-1, 40-2, the amount of subsampling is varied, and the image resolution is successively changed. Further, for each image resolution, the representative position of the object is calculated. The calculated representative positions for a plurality of image resolutions are averaged in the averaging unit 50. As a result, precision of the representative position of the object may be improved.

Further, the present invention is not limited to these embodiments, but other variations and modifications may be made without departing from the scope of the present invention.

What is claimed is:

1. An image-feature tracking apparatus for tracking an object, comprising:

feature deriving means for deriving a feature in an image of the object;

matching operation means for matching two frames of said image defined at different times in said image and producing an approximate motion vector of said feature indicating a motion of said feature; and motion-vector correcting means for correcting said approximate motion vector produced by said matching operation means based on a value of said approximate motion vector and a position of said feature derived by said feature deriving means, and producing a corresponding corrected motion vector which is dynamically corrected in vertical and horizontal directions;

wherein a position of said object is detected from the corrected motion vector produced by the motion-vector correcting means.

2. The apparatus as claimed in claim 1, wherein:

said matching operation means comprises means for calculating block matching of a first block image and a second block image in said two frames, and means for calculating a position of said feature in said second block image where said block matching is maximum and producing the position of the feature as said approximate motion vector; and said motion-vector correcting means comprises means for correcting said approximate motion vector by adding a deviation between positions of the feature in said two frames to said approximate motion vector.

3. The apparatus as claimed in claim 1, further comprising an imaging device which images said object and provides an image of said object to said matching operation means and said feature deriving means.

4. The apparatus as claimed in claim 1, wherein said motion-vector correcting means produces a plurality of motion vectors, and the apparatus further comprises means for calculating a center position of a plurality of features in said image based on said plurality of motion vectors produced by said motion-vector correcting means, and movement of said object is calculated by using said center position of said plurality of features as a representative position of said object.

5. The apparatus as claimed in claim 4, further comprising means for calculating a degree of rotation, expansion, and contraction of said object based on said plurality of motion vectors produced by said motion-vector correcting means.

6. The apparatus as claimed in claim 4, further comprising:

means for changing image resolution of said object; and means for averaging a plurality of said representative positions of said object provided for a plurality of image resolutions.

7. An image-feature tracking method for tracking an object, comprising the steps of:

(a) deriving a feature in an image of said object;

(b) matching two frames of said image defined at different times in said image and producing an approximate motion vector of said feature indicating a motion of said feature; and (c) correcting said approximate motion vector provided in said step (b) based on a value of said approximate motion vector and a position of said feature derived in said step (a), to produce a corresponding corrected motion vector which is dynamically corrected in vertical and horizontal directions;

wherein a position of said object is detected from said corrected motion vector produced in said step (c).

8. An apparatus for processing an image of an object, the image including first and second frames at first and second times, respectively, the apparatus comprising:

a feature deriving unit which derives a feature of the object from the second frame of the image;

a matching operation unit which matches the first and second frames to produce an approximate motion vector of the feature, indicating a motion of said feature, derived by the feature deriving unit; and a motion-vector correcting unit which corrects the approximate motion vector produced by the matching operation unit based on a value of said approximate motion vector and a position of the feature derived by said feature deriving unit to produce a corresponding corrected motion vector which is dynamically corrected in the vertical and horizontal directions.

9. The apparatus as in claim 8, wherein the matching operation unit determines the approximate motion vector by performing block matching for first and second block images of the first and second frames, respectively.

10. The apparatus as in claim 8, further comprising:

an imaging device which produces the image of the object and provides the image of the matching operation unit and the feature deriving unit.

11. The apparatus as claimed in claim 8, wherein the motion-vector correcting unit produces a plurality of motion vectors, the feature deriving unit derives a plurality of features of the image, and the apparatus further comprises a center position unit which calculates a center position of the plurality of features derived by the feature deriving unit based on the plurality of motion vectors produced by the motion-vector correcting unit, and movement of the object is calculated from the center position of the plurality of features as a representative position of the object.

12. A method for processing an image of an object, the image including first and second frames at first and second times, respectively, the method comprising the steps of:

deriving a feature of the object from the second frame of the image;

matching the first and second frames to produce an approximate motion vector of the derived feature which indicates a motion of the feature; and correcting the approximate motion vector based on a value of said approximate motion vector and a position of the derived feature to produce a corresponding motion vector which is dynamically corrected in the vertical and horizontal directions.

\* \* \* \* \*